US012662578B2

(12) United States Patent
    Glogowski

(10) Patent No.:    US 12,662,578 B2
(45) Date of Patent:        Jun. 23, 2026

(54) NON-LINEAR STIMULI-RESPONSIVE BLOCK COPOLYMERS FOR ARCHITECTURAL COATING APPLICATIONS

(71) Applicant: WiSys Technology Foundation, Inc., Madison, WI (US)

(72) Inventor: Elizabeth Marie Glogowski, Eau Claire, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 18/830,711

(22) Filed: Sep. 11, 2024

(65) Prior Publication Data

US 2025/0084219 A1     Mar. 13, 2025

Related U.S. Application Data

(60) Provisional application No. 63/537,587, filed on Sep. 11, 2023.

(51) Int. Cl.
    *C08G 83/00*        (2006.01)
    *C08K 3/22*         (2006.01)
(52) U.S. Cl.
    CPC .............. *C08G 83/003* (2013.01); *C08K 3/22* (2013.01); *C08K 2003/2241* (2013.01)
(58) Field of Classification Search
    None
    See application file for complete search history.

(56) References Cited

U.S. PATENT DOCUMENTS

2022/0282095 A1    9/2022    Glogowski

OTHER PUBLICATIONS

Huan et al Supramolecular ABC Miktoarm Star Terpolymer Based on Host Guest Inclusion Complexation, Macromolecules 2012, 45, 5941-5947 (Year: 2012).*
Huang et al In-situ formation of silver nanoparticles stabilized by amphiphilic star-shpaed copolymer and their catalytic application, Applied Surface SCience 258(2012) 2655-2660 (Year: 2011).*
Steinschulte et al. A nondestructive, statistical method for determination of initiation efficiency: dipentaerythritol-aided synthesis of ternary ABC3 miktoarm stars using a combined "arm first" and "core first" approach. Polym Chem., 2013 4 3885 (Year: 2013).*
Yuan et al. Synthesis and self-assembly of pH responsive amphiphilic dendritic star-block terpolymers by the combination of ROP, ATRP and click chemistry. European Polymer Journal 47(2011) 949-958 (Year: 2011).*
Yuan et al. Star-shaped and star-block polymers with a porphyrin core: from LCST-UCST thermoresponsive transtision to tunable self-assembly behavious and fluorescence performance RSC Adv. 2016, 6, 6802 (Year: 2016).*
Feldberg et al. Surface Interactions Surpass Carbon-Carbon Bond: Understanding and Control of the Scission Behavior of Core Shell Polymer Brushes on Surfaces Molecular Physics, 114(21)(Year: 2013).*
Guo et al. Macroscopic Three-Dimensional Supramolecular Networsk Through Hierarchical Self-assembly of Polymer Vscicles. Acta Polymerica Sinica No. 4, Apr. 2008.*
Quienne, et al., "From Architectures to Cutting-Edge Properties, the Blooming World of Hydrophobically Modified Ethoxylated Urethanes (HEURs)," Macromolecules, 2020, pp. 6754-6766, vol. 53, https://dx.doi.org/10.1021/acs.macromol.0c01353.
Poe, et al., "Synthesis, Complex Formation, and Dilute-Solution Associative Behavior of Linear Poly(methacrylic acid)-graftpoly(2-ethyl-2-oxazoline)," Journal of Polymer Science: Part A: Polymer Chemistry, 2004, pp. 2520-2533, vol. 42, DOI: 10.1002/pola.20107.
Wu, et al., "Tailoring Hase Rheology Through Polymer Design: Effects of Hydrophobe Size, Acid Content, and Molecular Weight," JCT Research, Apr. 2005, 11 pages, vol. 2, No. 6.
Lee, et al., "Stimuli-responsive molecular brushes," Progress in Polymer Science 35, 2010, pp. 24-44, doi:10.1016/j.progpolymsci.2009.11.002.
Plamper, et al., "Tuning the Thermoresponsive Properties of Weak Polyelectrolytes: Aqueous Solutions of Star-Shaped and Linear Poly(N,N-dimethylaminoethyl Methacrylate)," Macromolecules, 2007, pp. 8361-8366, vol. 40, No. 23.

\* cited by examiner

*Primary Examiner* — Katarzyna I Kolb
(74) *Attorney, Agent, or Firm* — Bell & Manning, LLC

(57)            ABSTRACT

Provided are non-linear stimuli-responsive block copolymers, methods for synthesizing the block copolymers, and coating compositions comprising the block copolymers. In an embodiment, a composition is provided that comprises a non-linear stimuli-responsive block copolymer comprising a polyethylene glycol (PEG) block and a poly((2-dimethyl-amino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof.

20 Claims, 19 Drawing Sheets
(13 of 19 Drawing Sheet(s) Filed in Color)

FIG. 2

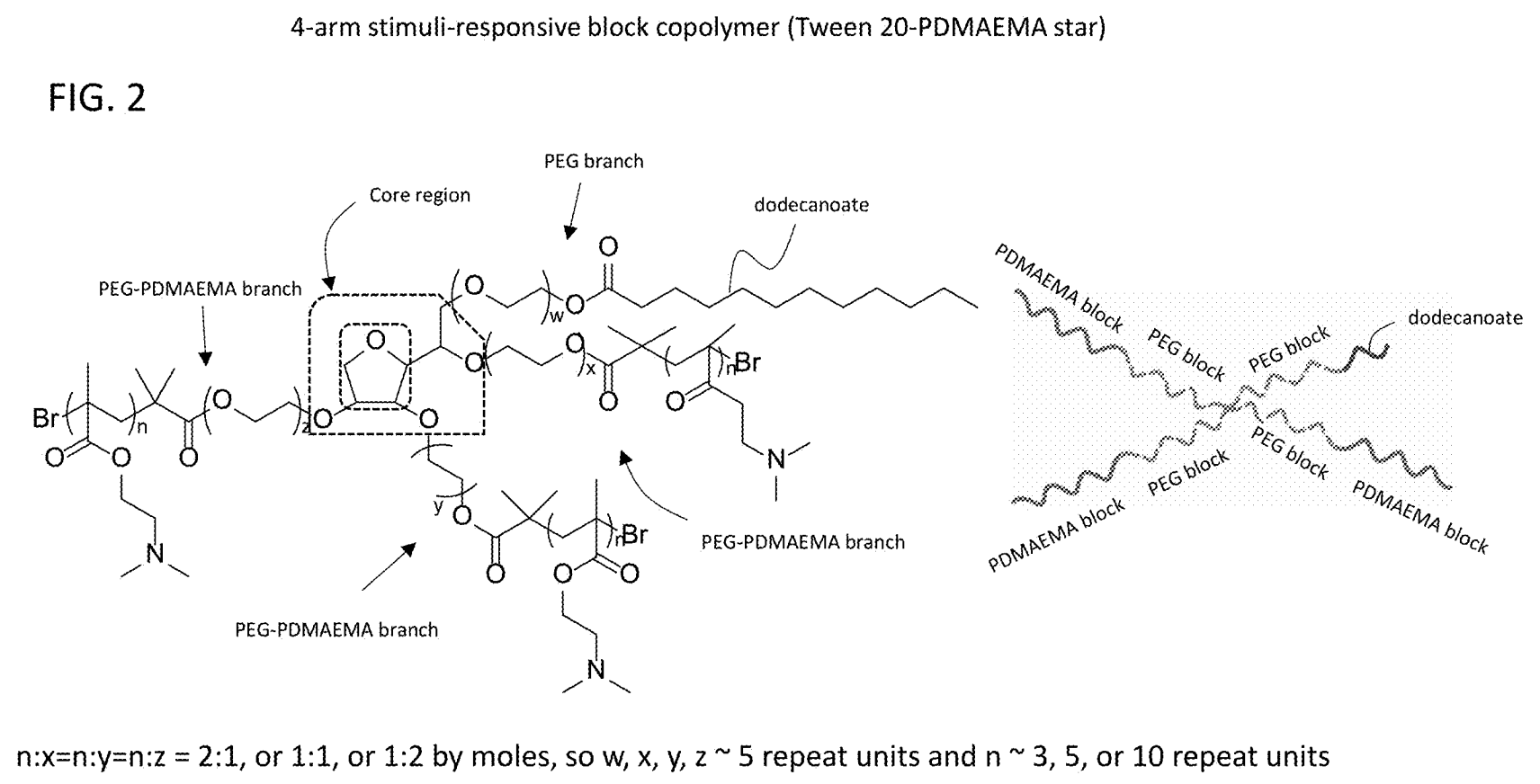

4-arm stimuli-responsive block copolymer (Tween 20-PDMAEMA star)

dodecanoate

PEG branch

Core region

PEG-PDMAEMA branch

PEG-PDMAEMA branch

PEG-PDMAEMA branch

PDMAEMA block

PEG block

PEG block

PEG block

PEG block

PDMAEMA block

PDMAEMA block

PDMAEMA block dodecanoate n:x=n:y=n:z = 2:1, or 1:1, or 1:2 by moles, so w, x, y, z ~ 5 repeat units and n ~ 3, 5, or 10 repeat units

Tween 28 w+x+y+z=80

FIG. 4B

Tween 80, w + x + x + y + z = 20

FIG. 4C

Tween 60, w + x + y + z = 20

FIG. 4D

Tween 40, w + x + y + z = 20

R = tripentearythritol core structure

NON-LINEAR STIMULI-RESPONSIVE BLOCK COPOLYMERS FOR ARCHITECTURAL COATING APPLICATIONS

CROSS-REFERENCE TO RELATED APPLICATIONS

The present application claims priority to U.S. provisional patent application No. 63/537,587 that was filed Sep. 11, 2023, the entire contents of which are hereby incorporated herein by reference.

BACKGROUND

Architectural coatings, such as paints, primers, and stains, require customized, specific, and complex formulations of components depending upon the specific application, which may range from interior paints to exterior stains, as well as the different environmental conditions under which the formulations are used. Formulations may also be required to have limited volatile organic compound content as well as exhibit customized features, such as paint-and-primer-in-one or one-coat-hide applications. The components of the formulations typically include pigments, fillers, solvents, as well as dispersants and viscosity modifiers. Titanium dioxide is a widely used pigment used to provide opacity in architectural coatings. However, it is difficult to prevent aggregation of expensive $TiO_2$, particularly in water-based architectural coatings. Viscosity requirements present another challenge as architectural coatings must easily spread when being applied (low viscosity) but adhere and remain in place after application (high viscosity). Although many formulations have been developed for architectural coatings, it is difficult to meet these disparate challenges.

SUMMARY

Provided are non-linear stimuli-responsive block copolymers, methods for synthesizing the block copolymers, and coating compositions comprising the block copolymers.

In an embodiment, a composition is provided that comprises a non-linear stimuli-responsive block copolymer comprising a polyethylene glycol (PEG) block and a poly ((2-dimethylamino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof.

Other principal features and advantages of the disclosure will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosure will hereafter be described with reference to the accompanying drawings.

FIG. 2 shows an illustrative non-linear stimuli-responsive block copolymer (Tween 20-PDMAEMA star). Tween 20 is poly(oxyethylene)$_n$-sorbitan-monolaurate, wherein n=20. Regarding the structure shown in FIG. 2, in addition to the values of n, x, y, z shown, n:x may also be 1:0.2 by moles with n~1.

FIG. 3 shows a synthetic scheme for the non-linear stimuli-responsive block copolymer of FIG. 2.

FIGS. 4A-4J show illustrative PEG precursors that may be used to synthesize other illustrative non-linear stimuli-responsive block copolymers. Regarding FIG. 4A, Tween 28 may be referred to as poly(oxyethylene)$_n$-sorbitan-monolaurate, wherein n=80. Regarding FIG. 4B, Tween 80 may be referred to as polyoxyethylene sorbitan monooleate. Regarding FIG. 4C, Tween 60 may be referred to as polyoxyethylene sorbitan monostearate. Regarding FIG. 4D, Tween 40 may be referred to as polyoxyethylene sorbitan monopalmitate. Regarding FIG. 4E, n may be in a range of from 4 to 23. Regarding FIG. 4F, n may be in a range of from 11 to 114. Regarding FIG. 4G, n may be in a range of from 64 to 113. Regarding FIGS. 4H and 4I, n may be in a range of from 28 to 114. Regarding FIG. 4J, n=m=303. The PEG precursor shown in FIG. 4E may be referred to as a 3-arm PEG having a molecular weight (which may vary). The PEG precursor shown in FIG. 4F may be referred to as a 4-arm PEG having a molecular weight (which may vary). The PEG precursor shown in FIG. 4G may be referred to as a 6-arm PEG having a molecular weight (which may vary). The PEG precursor shown in FIG. 4H may be referred to as an 8-arm PEG with a hexaglycerol core region and having a molecular weight (which may vary). The PEG precursor shown in FIG. 4I may be referred to as an 8-arm PEG with a tripentaerythritol core region and having a molecular weight (which may vary). The PEG precursor shown in FIG. 4J may be referred to as a y-PEG with a diamide core region and having a molecular weight (which may vary).

DETAILED DESCRIPTION

Figure 1:
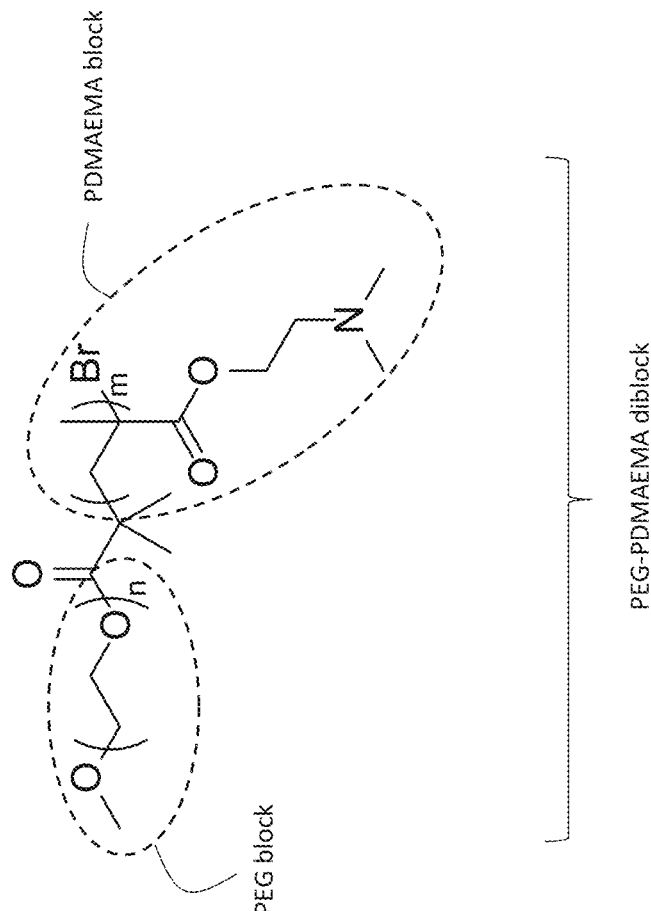
FIG. 1 shows an illustrative PEG block, PDMAEMA block, and a PEG-PDMAEMA diblock. Such blocks may be present in the multiple branches of the present stimuli-responsive block copolymers.

The present disclosure provides non-linear stimuli-responsive block copolymers based on polyethylene glycol (PEG) blocks and poly((2-dimethylamino)ethyl methacrylate) (PDMAEMA) blocks. The repeating units in PEG blocks may be referred to as oxyethylene repeating units and the repeating units in PDMAEMA blocks may be referred to as 2-dimethylamino)ethyl methacrylate repeating units. The stimuli-responsive block copolymers have at least one PEG block and at least one PDMAEMA block and thus, are distinguished from PEG homopolymers and PDMAEMA homopolymers, regardless of the morphology of such homopolymers. In embodiments, the block copolymer comprises multiple PEG blocks and at least one PDMAEMA block. In embodiments, the block copolymer comprises multiple PEG blocks and multiple PDMAEMA blocks. The PEG blocks constitute hydrophilic portions of the present copolymers. The PDMAEMA blocks constitute a stimuli-responsive portion(s) of the present block copolymers, resulting in properties (e.g., cloud point, solubility, interfacial tension, viscosity, viscoelasticity) that change with external triggers such as a change in temperature or a change in pH. Thus, depending upon their environment, the PDMAEMA blocks may be hydrophilic or hydrophobic.

The present stimuli-responsive block copolymers have a non-linear morphology which distinguishes them from the linear copolymers described in U.S. Pat. Pub. No. 20220282095. This renders the present stimuli-responsive block copolymers with unique properties as compared to such linear copolymers. Specifically, the present non-linear stimuli-responsive block copolymers comprise more than two (e.g., 3, 4, 5, 6, 7, 8, 9, or more) branches, each branch extending away from a common core region. (Throughout the present disclosure the term "branches" and "arms" may be used interchangeably.) The core region may comprise a central molecular moiety of the present block copolymer from which each branch extends therefrom, including radially. In embodiments, the block copolymer can assume a "star" morphology and thus, may be referred to as a "star block copolymer." Alternatively, the core region may comprise an extended molecular chain along which the branches are distributed, each branch extending away therefrom. Branches include those that extend perpendicularly away from a line defined by the extended molecular chain. In such embodiments, the present block copolymer can assume a "comb" morphology and thus, may be referred to as a "comb block copolymer." (Throughout the present disclosure the term "comb" and "brush" may be used interchangeably.) It is to be understood that the boundary between the core region and the branches originating therefrom is not particularly critical. For example, an atom or more than one atom of the core region and of one or more branches originating therefrom may be considered to be part of either the core region or a branch. However, the overall chemical composition of core regions and branches differ from one another. In addition, core regions do not comprise PEG blocks or PDMAEMA blocks. In embodiments in which the core region comprises a central molecular moiety, these core regions are non-polymeric, i.e., they do not comprise a chain of repeating molecular units derived from polymerization reactions. In embodiments in which the core region comprises an extended molecular chain, these core regions may be considered polymeric but the chain of repeating molecular units is not that found in PEG blocks or PDMAEMA blocks.

Regardless of the particular composition and morphology of the core region, the branches are polymeric in nature comprising a chain of repeating molecular units as found in PEG blocks and/or PDMAEMA blocks. Specifically, a branch may comprise a PEG block, a PDMAEMA block, or both a PEG block and a PDMAEMA block, e.g., a PEG-PDMAEMA diblock. Illustrative blocks are shown in FIG. 1. A branch comprising only a PEG block(s) (i.e., no PDMAEMA blocks) may be referred to as a PEG branch. A PEG branch may comprise a single PEG block or multiple PEG blocks. A branch comprising only a PDMAEMA block(s) (i.e., no PEG blocks) may be referred to as a PDMAEMA branch. A PDMAEMA branch may comprise a single PDMAEMA block or multiple PDMAEMA blocks. A branch comprising both a PEG block(s) and a PDMAEMA block(s) may be referred to as a PEG-PDMAEMA branch. A PEG-PDMAEMA branch may include a single PEG block and a single PDMAEMA block or multiples of one or both such blocks. It is to be understood that each of these embodiments does not preclude the presence of other atoms or molecular moieties (non-PEG, non-PDMAEMA moieties) that may be covalently bound within the branch to, or between, the various blocks. For example, the PEG branch in FIG. 2 includes a single PEG block and a dodecanoate moiety, the dodecanoate moiety covalently bound to the single PEG block.

Again, regardless of the particular composition and morphology of the core region, the present non-linear stimuli-responsive block copolymers may comprise various types of branches. In embodiments, the block copolymer comprises at least one PEG-PDMAEMA branch. In embodiments, the block copolymer comprises multiple PEG-PDMAEMA branches (e.g., 2, 3, 4, 5, 6, 7, etc.). In embodiments, all branches of the block copolymer are PEG-PDMAEMA branches. In embodiments, the block copolymer comprises at least one PEG-PDMAEMA branch and at least one PEG branch. In embodiments, the block copolymer comprises one PEG-PDMAEMA branch and multiple PEG branches (e.g., 2). In embodiments, the block copolymer comprises multiple PEG-PDMAEMA branches (e.g., 3, 4, 5, 6, 7, etc.) and one PEG branch. In embodiments, the block copolymer comprises one PDMAEMA branch and multiple PEG branches (e.g., in a range of from 5 to 25).

In the present non-linear stimuli-responsive block copolymers, the composition of the core region, the composition of each branch (including the number of PEG blocks, PDMAEMA blocks, and PEG-PDMAEMA blocks), the overall block copolymer morphology (star, comb), and the number of branches may be selected based on the desired properties for the block copolymer as well as its intended application. However, regarding an individual PEG block, an individual PDMAEMA block, and an individual PEG-PDMAEMA block within an individual branch, with reference to FIG. 1, n may range from 5 to 114 (this includes from 10 to 100, from 25 to 75, and from 40 to 60) and m may range from 3 to 228 (this includes from 5 to 200, from 25 to 150, and from 40 to 100). Within an individual branch that includes both PEG and PDMAEMA blocks, the molar ratio of PEG:PDMAEMA may range from 1:0.1 to 1:5 (this includes from 1:0.1 to 1:4, from 1:0.8 to 1:4, and from 1:1: to 1:2). Regarding the entire block copolymer, the number average molecular weight $M_n$ may range from 2000 to 90000 g/mol (this includes from 5000 to 45000 g/mol and from 10000 to 25000 g/mol).

An illustrative non-linear stimuli-responsive block copolymer is shown in FIG. 2 (its chemical structure is shown to the left and a schematic depiction of its star morphology is shown to the right). As described in the Examples, below, this block copolymer was synthesized using a commercially available PEG precursor (Tween 20, also known as Polysorbate 20 as well as the chemical name provided above) and dimethylamino ethyl methacrylate (DMAEMA) monomer via Activator Regenerated by Electron Transfer Atom Transfer Radical Polymerization (ARGET ATRP). The core region of the block copolymer comprises a sorbitan moiety (shown in the larger dashed box), which comprises a tetrahydrofuran moiety (shown in the smaller dashed box). Four branches extend radially away from the core region, including three PEG-PDMAEMA branches and a PEG branch. The PEG branch further includes a dodecanoate moiety.

Figure 3:
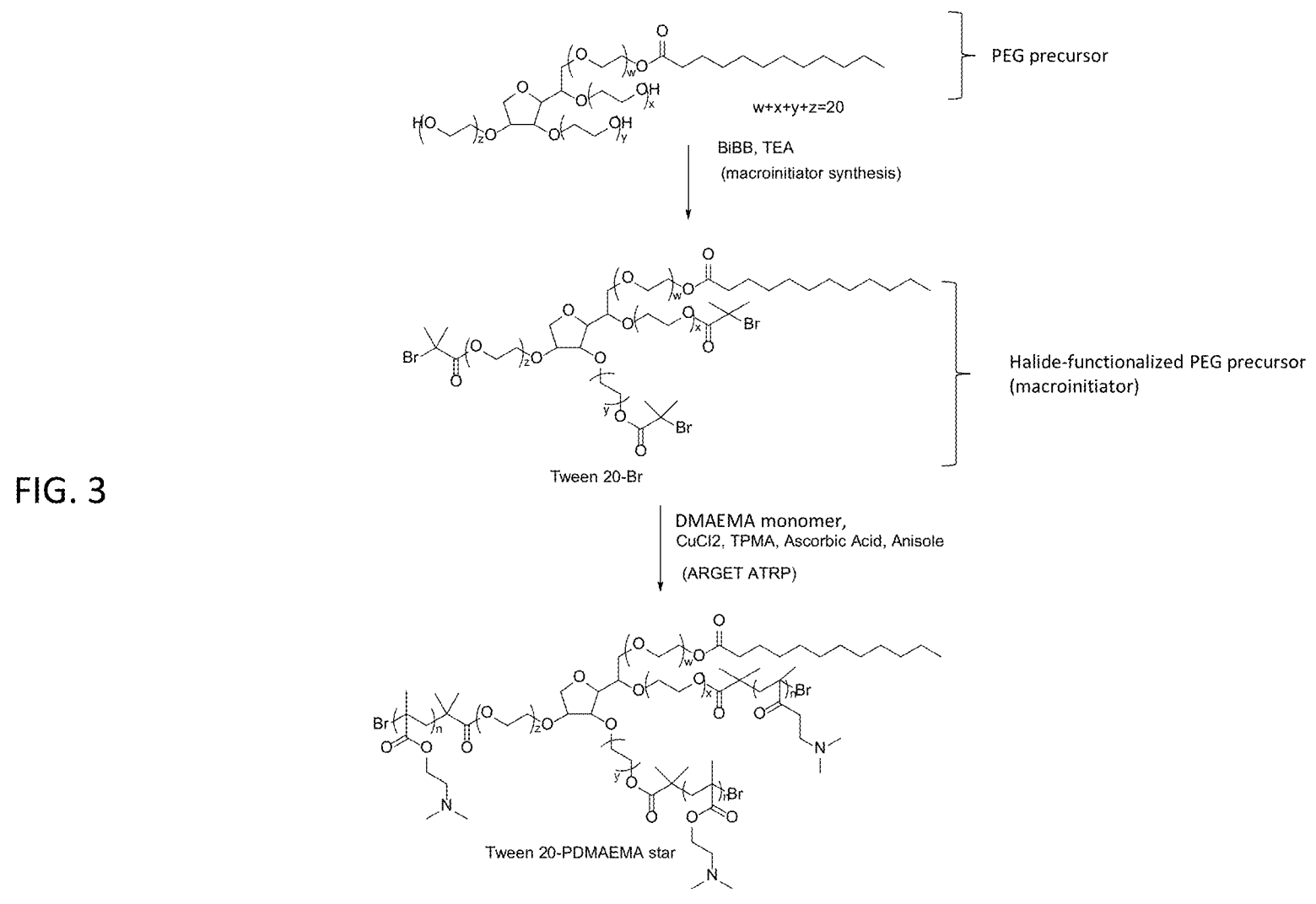

The ARGET ATRP synthetic scheme for the non-linear stimuli-responsive block copolymer of FIG. 2 is shown in FIG. 3. Briefly, this scheme involves synthesizing a macroinitiator (here, the halide-functionalized PEG precursor, Tween 20-Br) by combining the PEG precursor (here, Tween 20) with an alkyl halide (here, $\alpha$-bromoisobutyryl bromide (BiBB)) under conditions to induce BiBB to react with hydroxyl groups on the PEG precursor. To ensure synthesis of the macroinitiator, it was found that the amount of the alkyl halide relative to the PEG precursor is desirably at least 10:1, at least 15:1, or at least 25:1. Next, the macroinitiator is combined with the DMAEMA monomer along with a catalyst (here, $CuCl_2$), a ligand (here, tris(2-pyridylmethyl) amine (TPMA)), ascorbic acid, and anisole under conditions to induce controlled free-radical polymerization of the DMAEMA monomer onto the macroinitiator. The molar ratio of the macroinitiator to the DMAEMA monomer may be selected depending upon the desired molecular weight for the block copolymer. The synthesized block copolymer (here, Tween 20-PDMAEMA star) may then be recovered via precipitation, filtering, and drying. Additional synthetic details are provided in the Examples, below.

A similar ARGET ATRP procedure may be used to synthesize other illustrative non-linear stimuli-responsive block copolymers using other commercially available PEG precursors and DMAEMA monomer. Illustrative other PEG precursors are shown in FIGS. 4A-4J. The Tween-type PEG precursors of FIGS. 4A-4D each result in a block copolymer having a star morphology similar to that shown schematically in FIG. 2. Specifically, each block copolymer resulting from the PEG precursors of FIGS. 4A-4D comprises a core region comprising a sorbitan moiety and four branches extending radially therefrom, including three PEG-PDMAEMA branches and a PEG branch. Each PEG branch further comprises a fatty acid moiety (or ester thereof) which may be unsaturated (monounsaturated or polyunsaturated) or saturated. The fatty acid moiety may include various numbers of carbon atoms, e.g., from 6 to 22, 6 to 12, or from 10 to 22. Illustrative fatty acid moieties include lauric acid, oleic acid, stearic acid, palmitic acid. The specific chemical structure of each core region and each branch differ among the block copolymers, due to the different PEG precursor being used.

Thus, in embodiments, the non-linear stimuli-responsive block copolymer has a star morphology and comprises or consists of a core region and a single PEG branch and multiple PEG-PDMAEMA branches, each branch extending radially from the core region. The core region may be a sorbitan moiety. The number of PEG-PDMAEMA branches may be 3. The single PEG branch may comprise or consist of a single PEG block and optionally, a fatty acid moiety covalently bound to the single PEG block. The fatty acid moiety may be any of those described above. Each PEG-PDMAEMA branch may comprise or consist of a single PEG block and a single PDMAEMA block. The PEG block in the PEG branch and in each PEG-PDMAEMA branch may have an n value within any of the values described above with respect to FIG. 1 (or a w, x, y, z value as shown in FIGS. 2 and 4A-4D). The PDMAEMA block in each PEG-PDMAEMA branch may have an m value within any of the values described above with respect to FIG. 1 (or an n value as shown in FIG. 2). Each PEG-PDMAEMA branch may have a PEG:PDMAEMA molar ratio within any of the values described above. In any of the embodiments in this paragraph, a total number of repeating oxyethylene units in the non-linear stimuli-responsive block copolymer may be in a range of from 20 to 80 and a molar ratio of oxyethylene units to (2-dimethylamino)ethyl methacrylate units is in a range of from 1:0.1 to 1:5. This includes from 1:0.1 to 1:4, from 1:0.8 to 1:4, and from 1:1: to 1:2.

Figures 4A, 4B, 4C, 4D:
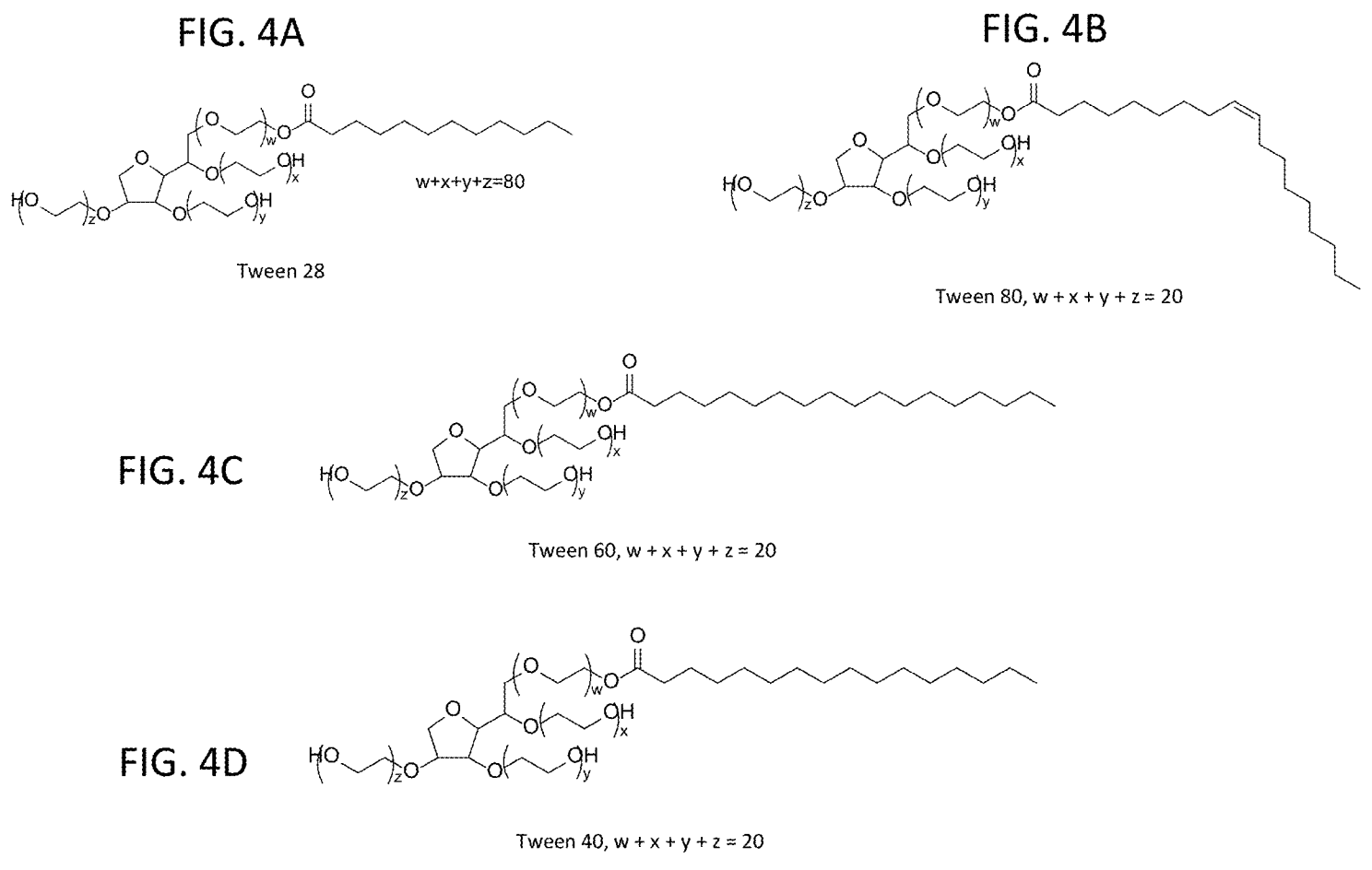
Figures 4E, 4F, 4G:
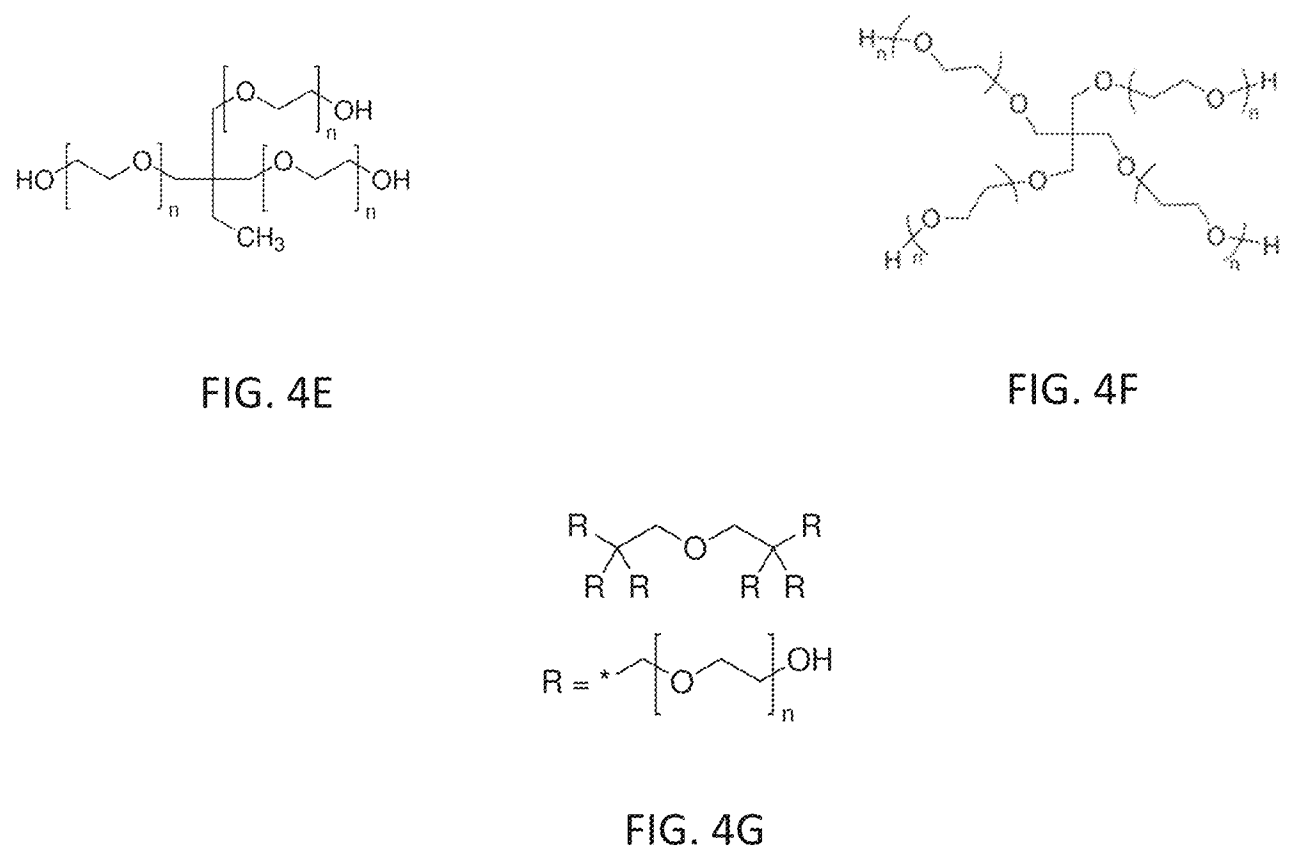

The illustrative PEG precursors shown in FIGS. 4E-4G also each result in a non-linear stimuli-responsive block copolymer having a star morphology. In the case of FIG. 4E, the PEG precursor results in a block copolymer comprising an unsubstituted branched alkyl moiety ($C(CH_2)_3$ ($CH_2CH_3$)) as the core region and three PEG-PDMAEMA branches extending radially therefrom. In the case of FIG. 4F, the PEG precursor results in a block copolymer comprising a substituted branched alkyl moiety ($C(CH_2O)_4$) as the core region and four PEG-PDMAEMA branches extending therefrom. In the case of FIG. 4G, the PEG precursor results in a block copolymer comprising a core region comprising an alkyl ether moiety (diethyl ether) and a total of six PEG-PDMAEMA branches extending radially therefrom.

Thus, in embodiments, the non-linear stimuli-responsive block copolymer has a star morphology and comprises or consists of a core region and multiple PEG-PDMAEMA branches extending radially from the core region. The core region may be a branched alkyl moiety (which may be unsubstituted containing no heteroatoms or substituted containing a heteroatom(s)) or an alkyl ether moiety. The branched alkyl moiety and the alkyl ether moiety may be any of those described above. The number of PEG-PDMAEMA branches may be 3, 4, 5, or 6. Each PEG-PDMAEMA branch may comprise or consist of a single PEG block and a single PDMAEMA block. The PEG block in each PEG-PDMAEMA branch may have an n value within any of the values described above with respect to FIG. 1 or FIGS. 4E-4G. The PDMAEMA block in each PEG-PDMAEMA branch may have an m value within any of the values described above with respect to FIG. 1. Each PEG-PD-MAEMA branch may have a PEG:PDMAEMA molar ratio within any of the values described above.

Figures 4H, 4I:
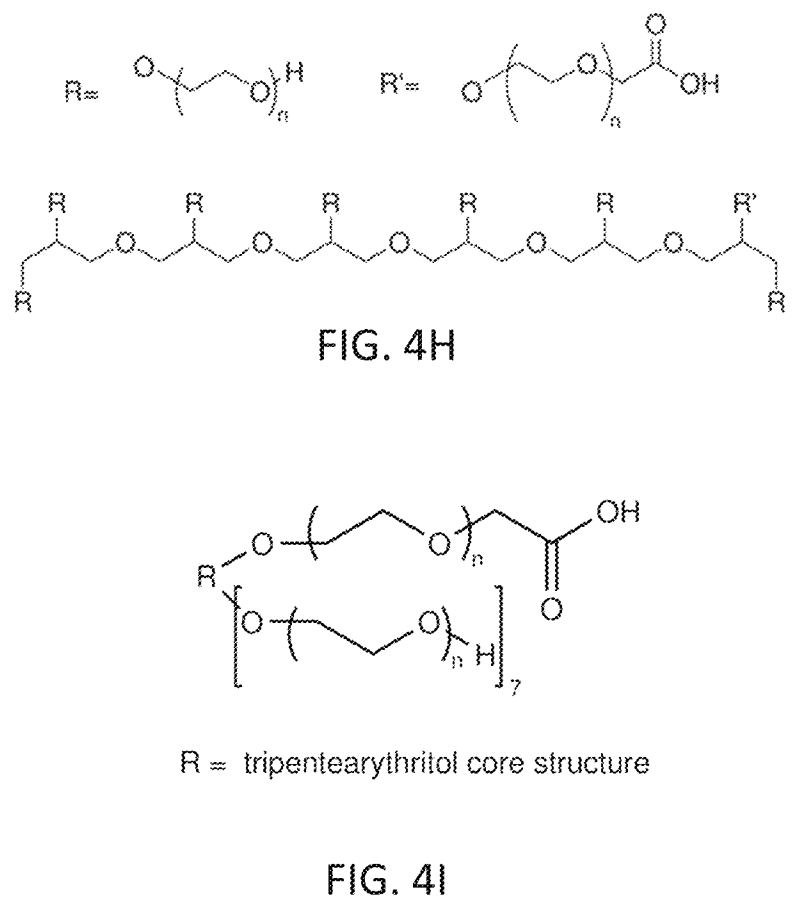

The illustrative PEG precursors shown in FIGS. 4H and 4I each result in a non-linear stimuli-responsive block copolymer having a comb morphology. Each block copolymer comprises a core region comprising a polyether extended molecular chain along which a total of eight branches are distributed, each branch extending away therefrom. The eight branches include seven PEG-PDMAEMA branches and one PEG branch.

Thus, in embodiments, the non-linear stimuli-responsive block copolymer has a comb morphology and comprises or consists of a core region in the form of an extended molecular chain and a single PEG branch and multiple PEG-PDMAEMA branches, the branches distributed along the extended molecular chain and extending away therefrom. The extended molecular chain may be a polyether moiety. The number of PEG-PDMAEMA branches may be 7. Each PEG-PDMAEMA branch may comprise or consist of a single PEG block and a single PDMAEMA block. The PEG block in each PEG-PDMAEMA branch may have an n value within any of the values described above with respect to FIG. 1 or FIGS. 4H-4I. The PDMAEMA block in each PEG-PDMAEMA branch may have an m value within any of the values described above with respect to FIG. 1. Each PEG-PDMAEMA branch may have a PEG:PDMAEMA molar ratio within any of the values described above.

Figure 4J:
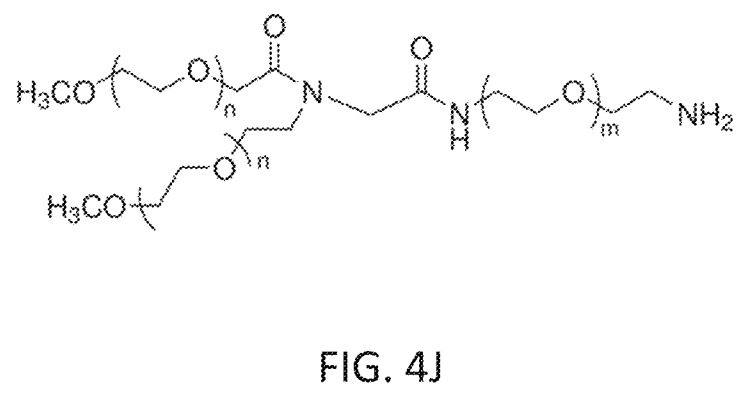

The illustrative PEG precursor shown in FIG. 4J results in a non-linear stimuli-responsive block copolymer having a star morphology. In this case, the primary amine group on the PEG precursor is reactive with the alkyl halide used in the macroinitiator synthesis. The PEG precursor results in a block copolymer comprising a diamide moiety (C(O)N(CH$_2$)C(O)NH) as the core region and three branches extending radially therefrom, including one PEG-PD-MAEMA branch and two PEG branches.

Thus, in embodiments, the non-linear stimuli-responsive block copolymer has a star morphology and comprises or consists of a core region, a single PEG-PDMAEMA branch, and multiple PEG branches, each branch extending radially from the core region. The core region may be a diamide moiety, including that described above. The number of PEG branches may be two. The PEG-PDMAEMA branch may comprise or consist of a single PEG block and a single PDMAEMA block. Each PEG branch may comprise or consist of a single PEG block. The PEG block in the PEG-PDMAEMA branch and in each PEG branch may have an n value within any of the values described above with respect to FIG. 1 or FIG. 4J. The PDMAEMA block in the PEG-PDMAEMA branch may have an m value within any of the values described above with respect to FIG. 1. Each PEG-PDMAEMA branch may have a PEG:PDMAEMA molar ratio within any of the values described above.

Figure 5:
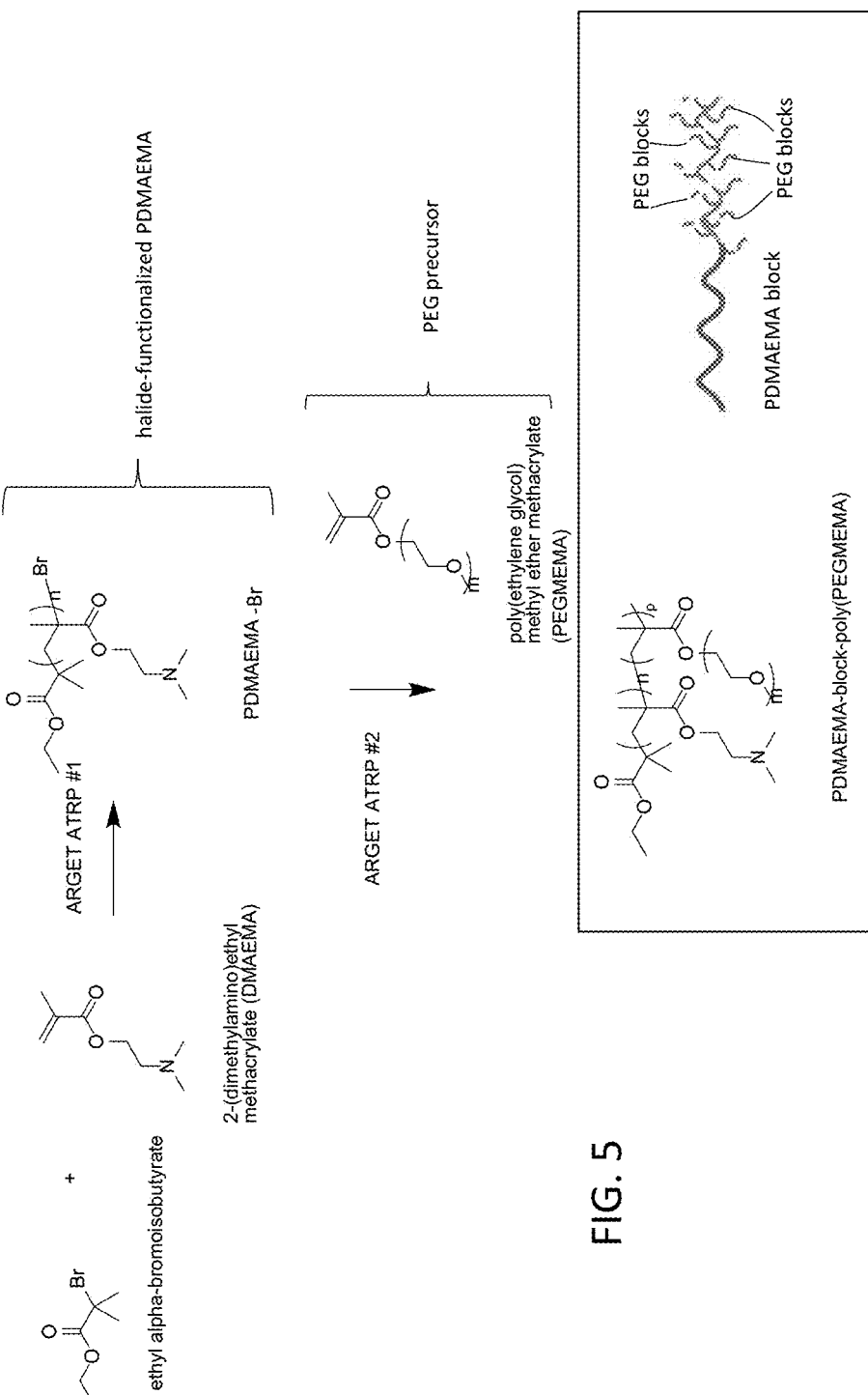
FIG. 5 shows an illustrative non-linear stimuli-responsive block copolymer (PDMAEMA-block-poly(PEGMEMA)) and a corresponding synthetic scheme. The values of n may be in a range of from 5 to 50, m may be in a range of from 6 to 45, and p may be in a range of from 5 to 25.

Another illustrative non-linear stimuli-responsive block copolymer is shown in the box of FIG. 5 (its chemical structure is shown to the left and a schematic depiction of its comb morphology is shown to the right) along with its synthetic scheme, also based on ARGET ATRP. This block copolymer was also synthesized as described in the Examples, below. Specifically, a first ARGET ATRP step is performed in which an alkyl halide (here, ethyl α-bromoisobutyrate) and DMAEMA monomer are combined under conditions to induce controlled free-radical polymerization of the DMAEMA monomer onto the alkyl halide initiator, thereby forming halide-functionalized PDMAEMA. Next, a second ARGET step is performed in which the halide-functionalized PDMAEMA and a PEG precursor (here, poly(ethylene glycol) methyl ether methacrylate (PEGMEMA)) are combined under conditions to induce controlled free-radical polymerization of the PEG precursor onto the halide-functionalized PDMAEMA. The molar ratio of the halide-functionalized PDMAEMA to the PEG precursor may be selected depending upon the desired molecular weight for the block copolymer. The synthesized block copolymer (here, PDMAEMA-block-poly(PEG-MEMA) may then be recovered via precipitation, filtering, and drying. Additional details for each ARGET ATRP step follow from the analogous ARGET ATRP step illustrated in FIG. 3 and further described in the Examples, below.

The resulting block copolymer shown in FIG. 5 comprises a core region comprising a polyalkyl extended molecular chain along which multiple branches are distributed, each branch extending away therefrom. The multiple branches include one PDMAEMA branch and multiple PEG branches.

Thus, in embodiments, the non-linear stimuli-responsive block copolymer has a comb morphology and comprises or consists of a core region in the form of an extended molecular chain and a single PDMAEMA branch and multiple PEG branches, the branches distributed along the extended molecular chain and extending away therefrom. The extended molecular chain may be a polyalkyl moiety. The number of PEG branches may be in a range of from 5 to 25. The PDMAEMA branch may comprise or consist of a single PDMAEMA block. Each PEG branch may comprise or consist of a single PEG block. The PDMAEMA block may have an m value within any of the values described above with respect to FIG. 1 (or n values as described above with respect to FIG. 5). The PEG block in each PEG branch may have an n value within any of the values described above with respect to FIG. 1 (or m values as described above with respect to FIG. 5).

The present non-linear stimuli-responsive block copolymers may be identified by reference to either their chemical structure/name, e.g., the structures shown in FIG. 2 and FIG. 5. However, the block copolymers may also be identified by reference to the ARGET ATRP polymerization product formed from the relevant reactants, e.g., the PEG precursor (or the halide-functionalized version thereof, i.e., the macroinitiator) and the DMAEMA monomer (or the halide-functionalized polymer thereof), recognizing that the chemical form of these reactants change due to the polymerization process. For example, in embodiments, the block copolymer is the polymerization product of reactants comprising halide-functionalized Tween 20 (see FIG. 3) and DMAEMA (Tween 20 may also be referred to using the names provided above). In embodiments, the block copolymer is the polymerization product of reactants comprising halide-functionalized Tween 28 and DMAEMA (Tween 28 may also be referred to using the name provided above). In embodiments, the block copolymer is the polymerization product of halide-functionalized PDMAEMA (see FIG. 5) and PEG-MEMA. In each of these embodiments, the block copolymer may include other atom(s) or moieties that become incorporated from other reactants, e.g., the alkyl halide.

The present non-linear stimuli-responsive block copolymers may be characterized by various properties including cloud point, solubility, interfacial tension, viscosity, and viscoelasticity. Regarding viscoelasticity, this includes properties such as the linear viscoelastic region and the modulus crossover point for the block copolymer. Each of these properties may be measured using known techniques, including those described in the Examples, below.

Figure 6:
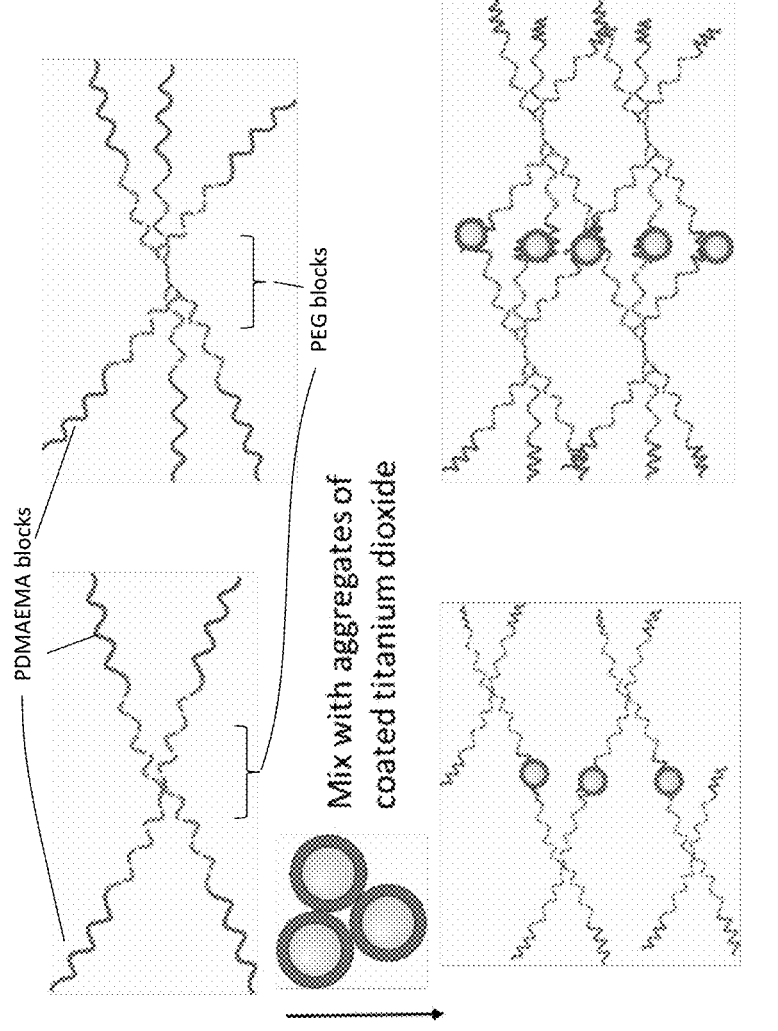
FIG. 6 shows a schematic illustration of the incorporation of two different non-linear stimuli-responsive block copolymers according to the present disclosure into a coating composition comprising coated $TiO_2$ particles.
Figure 7:
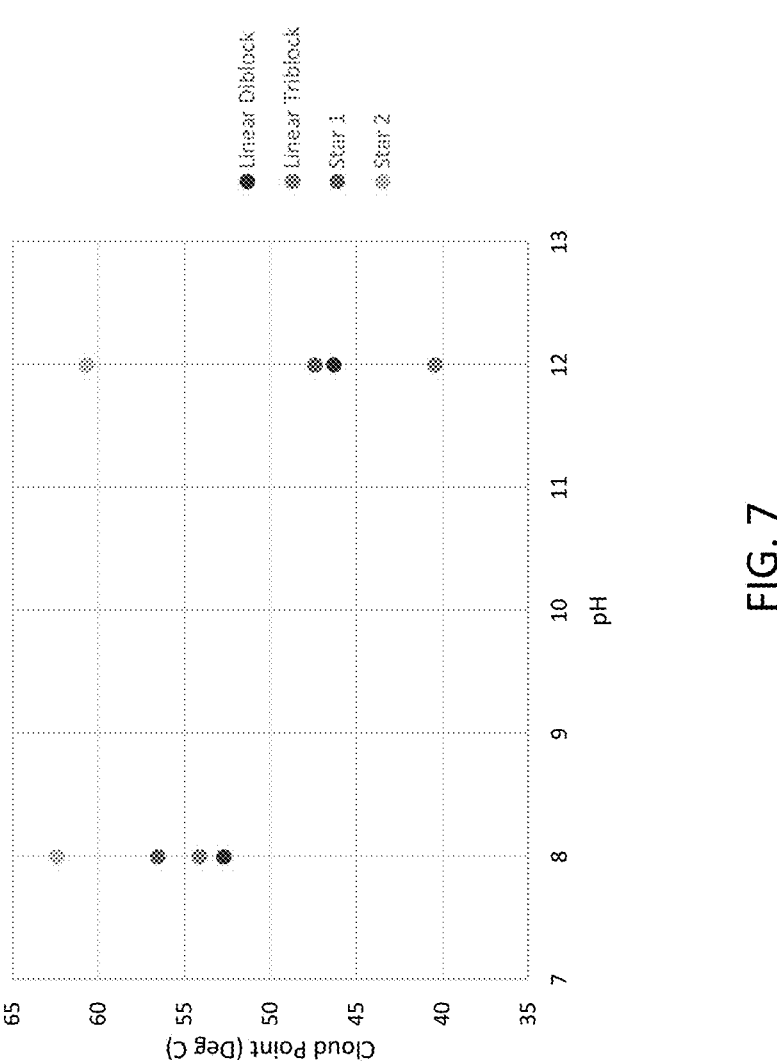
FIG. 7 shows a plot of the pH dependence of cloud point for two illustrative star stimuli-responsive block copolymers according to the present disclosure as compared to two linear block copolymers.
Figures 8A, 8B:
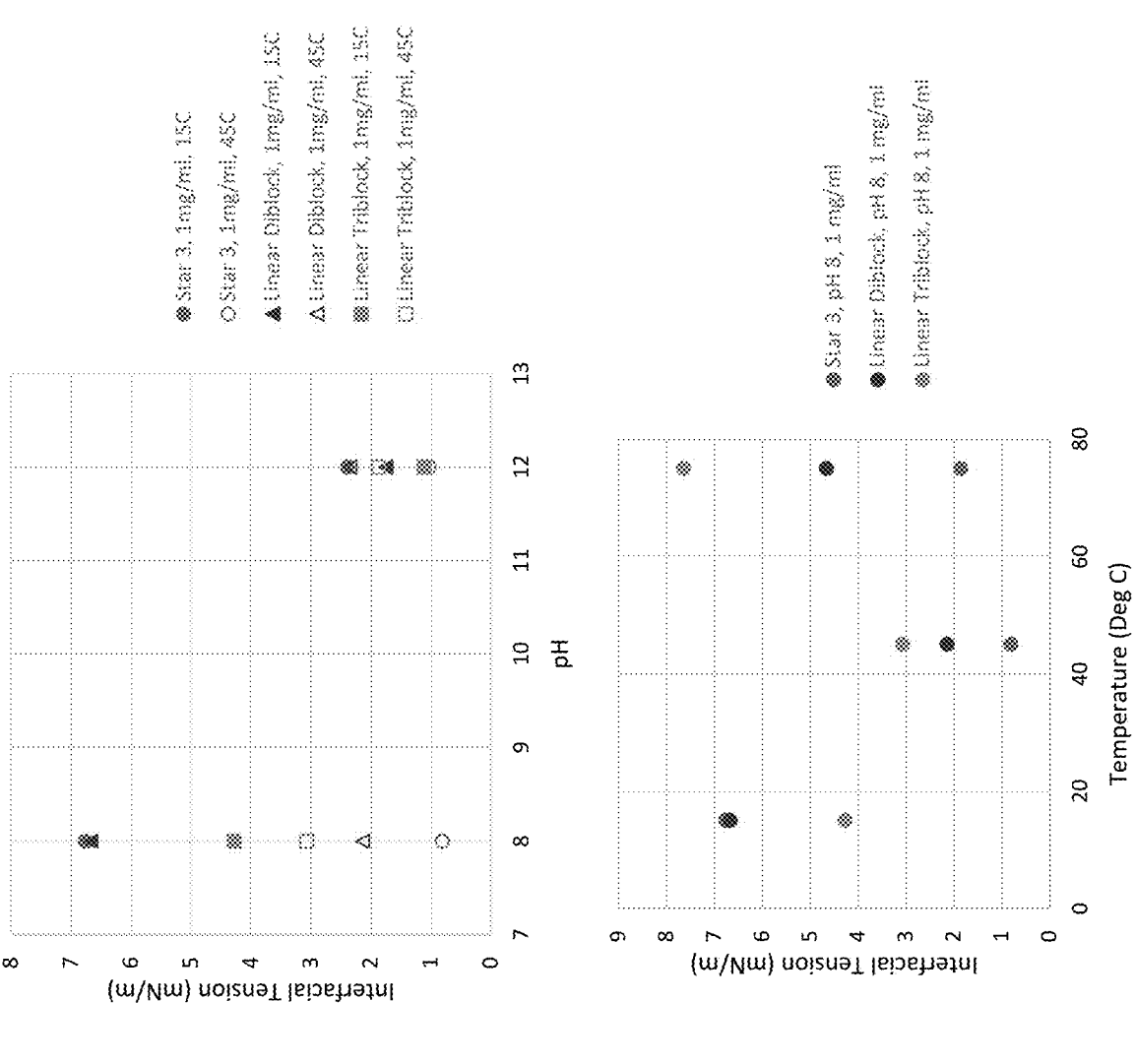
FIGS. 8A and 8B show plots of the pH dependence of interfacial tension for an illustrative star stimuli-responsive block copolymer according to the present disclosure as compared to two linear block copolymers.
Figures 9A, 9B:
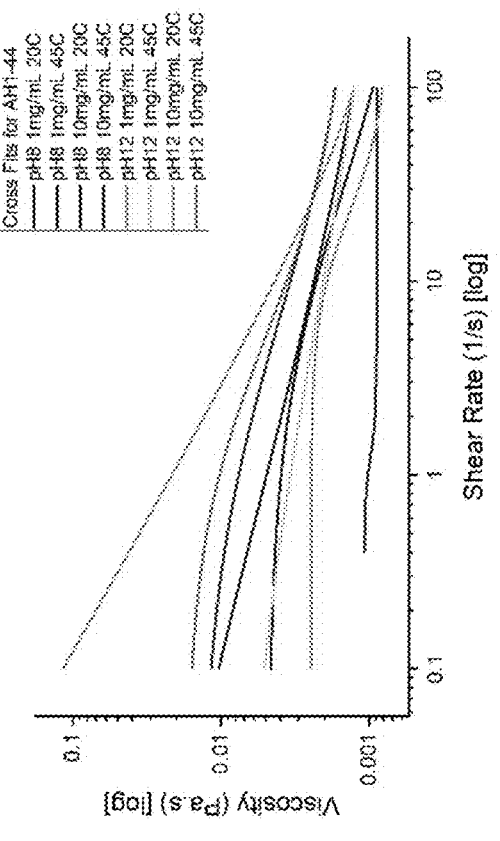
FIGS. 9A and 9B show graphs of the Cross-model applied to viscosity versus shear rate data for a linear block copolymer AH1-44 (FIG. 9A) and an illustrative star stimuli-responsive block copolymer CL2-25 according to the present disclosure (FIG. 9B).
Figure 10A:
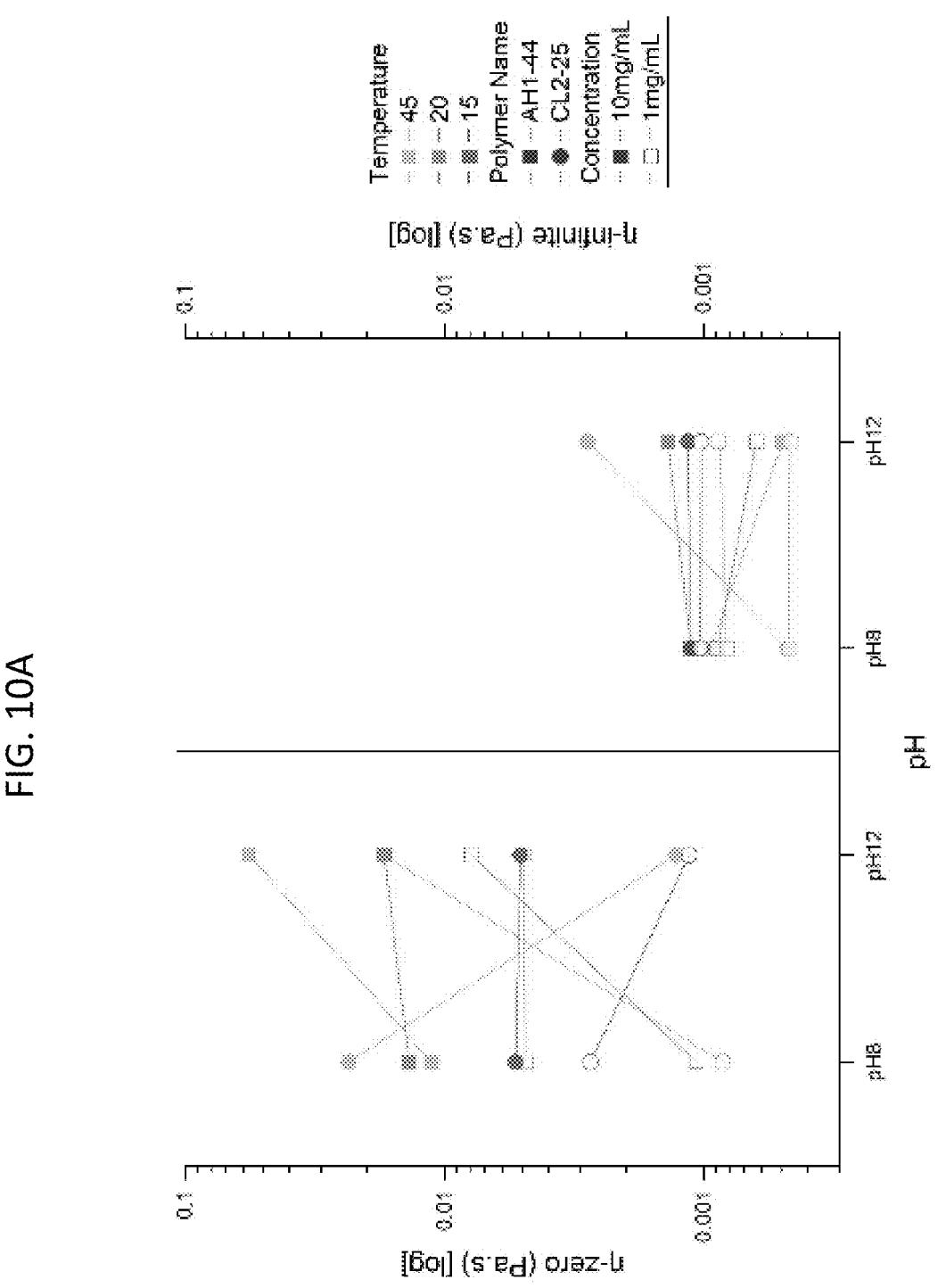
FIG. 10A shows a plot of zero-rate viscosity (left) and infinite rate viscosity (right) vs pH for a linear triblock copolymer (AH1-44) and an illustrative star stimuli-responsive block copolymer according to the present disclosure (CL2-25).
Figure 10B:
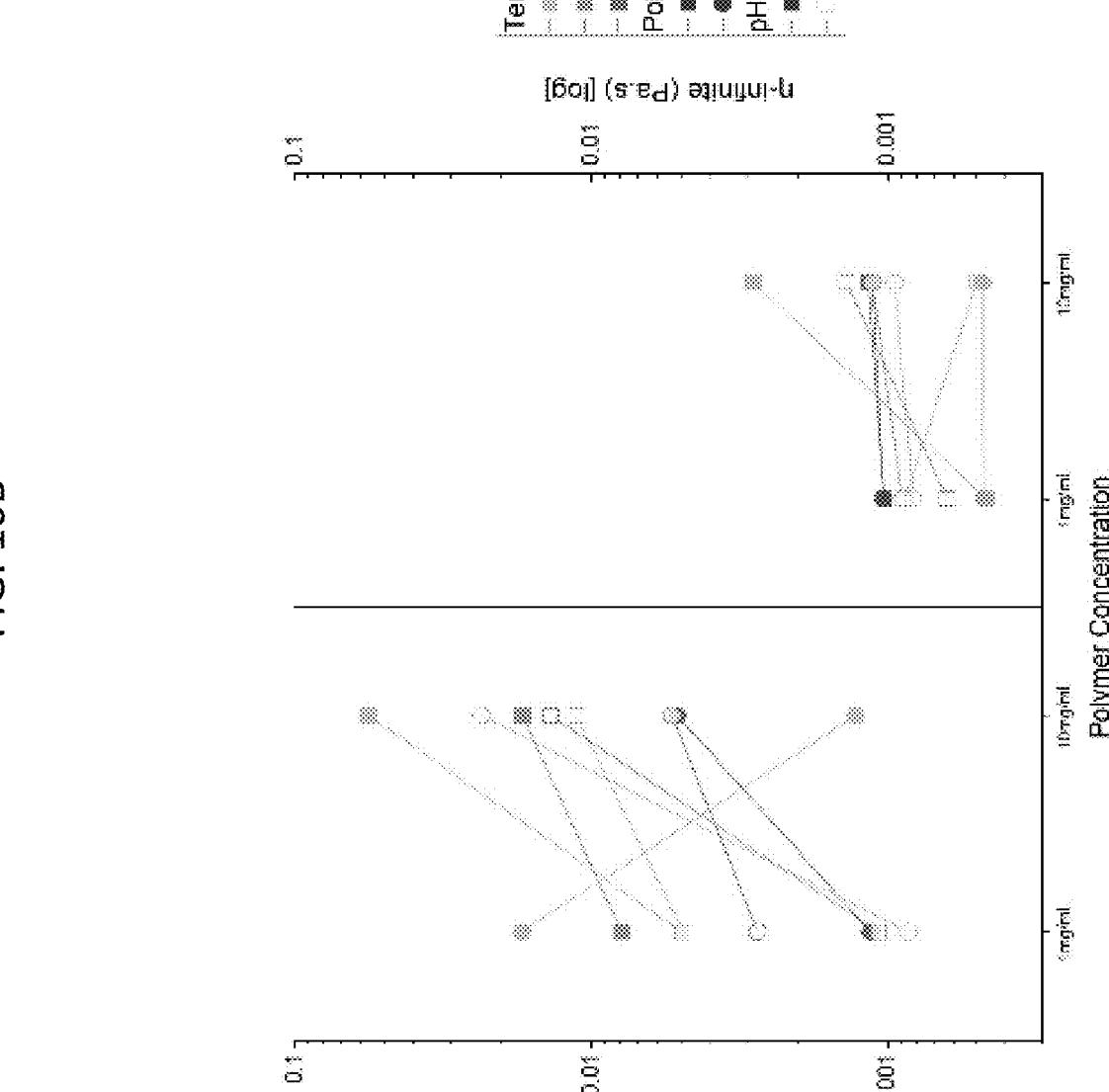
FIG. 10B shows a plot of zero-rate viscosity (left) and infinite rate viscosity (right) vs polymer concentration for a linear triblock copolymer (AH1-44) and an illustrative star stimuli-responsive block copolymer according to the present disclosure (CL2-25).
Figure 11B:
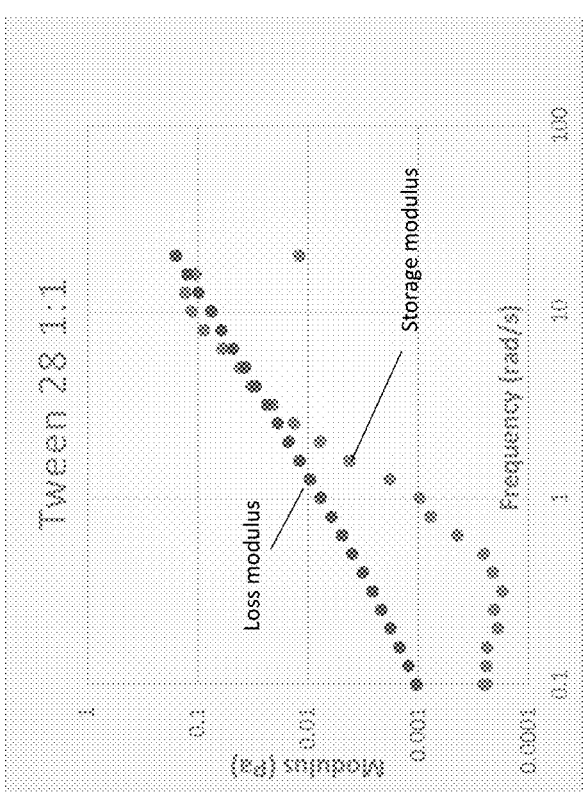
FIG. 11B shows a frequency sweep plot of an illustrative star stimuli-responsive block copolymer according to the present disclosure at pH 12 and 15° C.
Figure 11A:
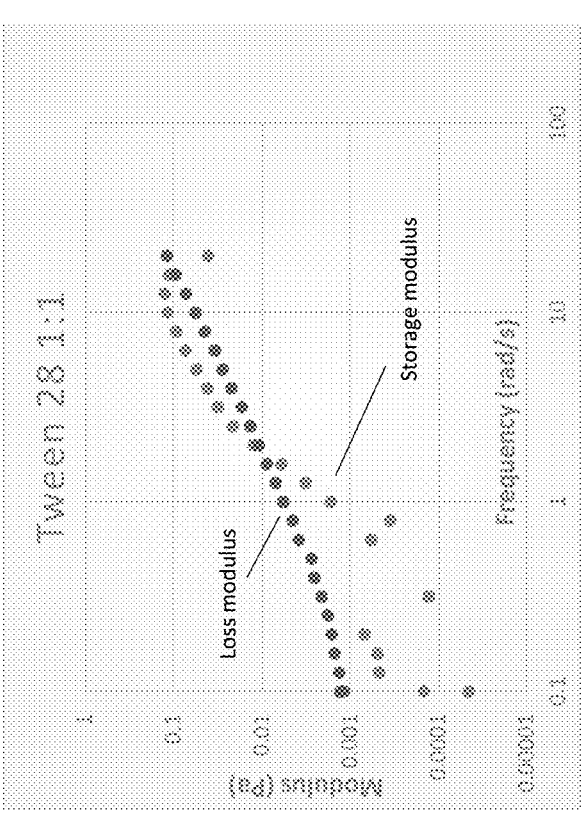
FIG. 11A shows a frequency sweep plot of an illustrative star stimuli-responsive block copolymer according to the present disclosure at pH 8 and 15° C.
Figure 12B:
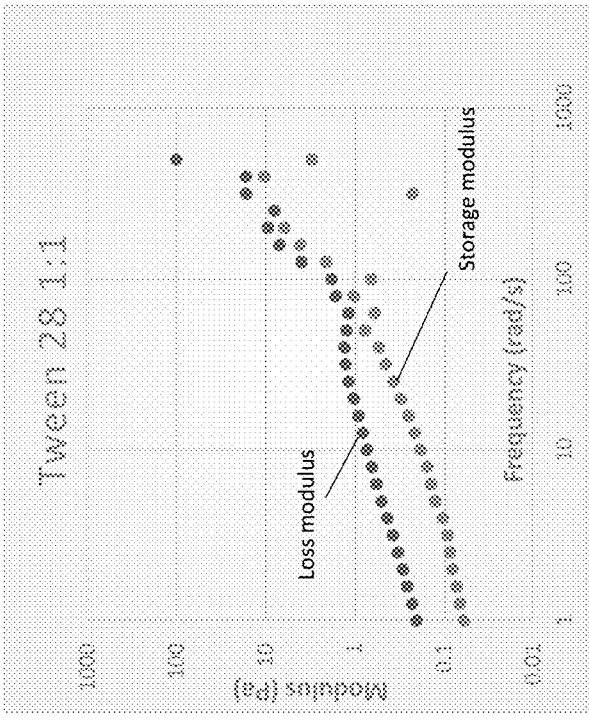
FIG. 12B shows a frequency sweep plot of an illustrative star stimuli-responsive block copolymer according to the present disclosure at pH 12 and 55° C.
Figure 12A:
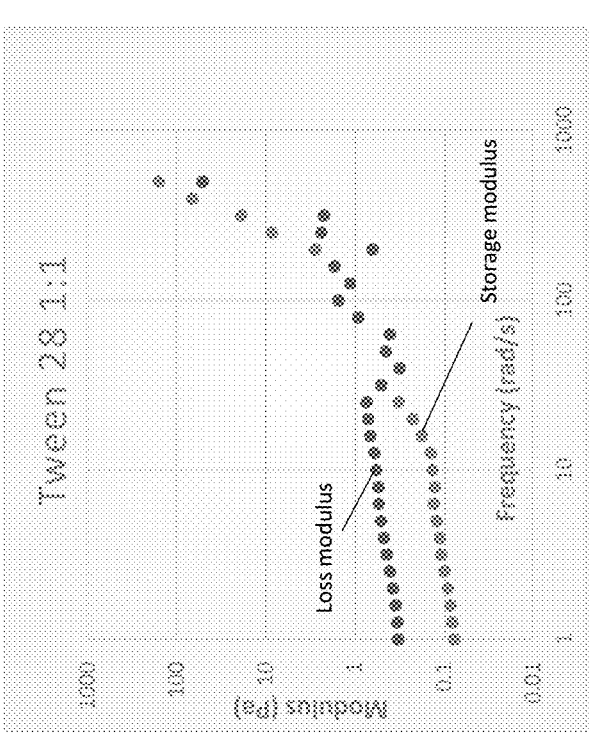
FIG. 12A shows a frequency sweep plot of an illustrative star stimuli-responsive block copolymer according to the present disclosure at pH 8 and 55° C.
Figures 13A, 13B:
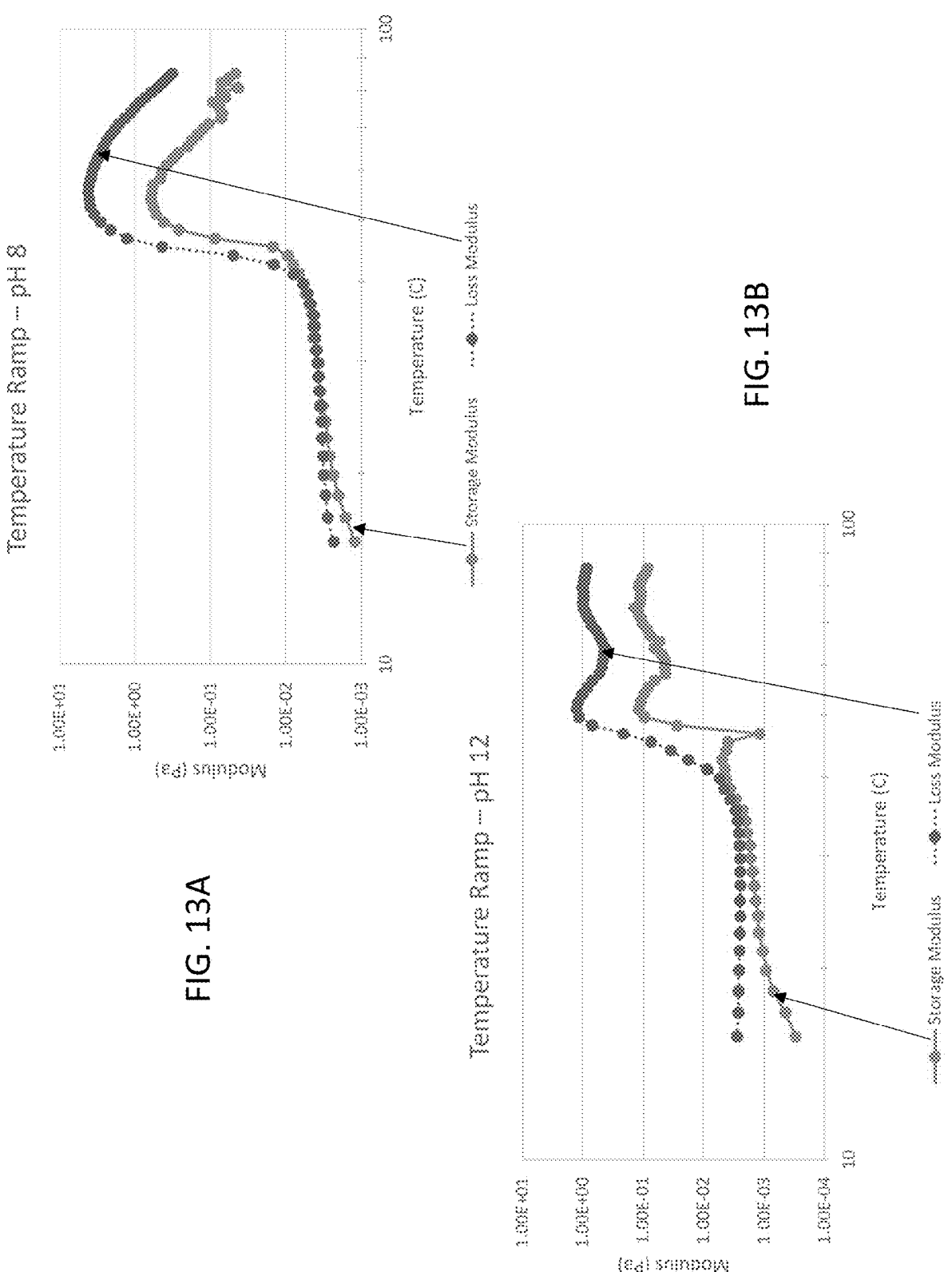
FIG. 13A shows a temperature ramp plot of an illustrative star stimuli-responsive block copolymer according to the present disclosure at pH 8.
FIG. 13B shows a temperature ramp plot of an illustrative star stimuli-responsive block copolymer according to the present disclosure at pH 12.
Figures 14A, 14B:
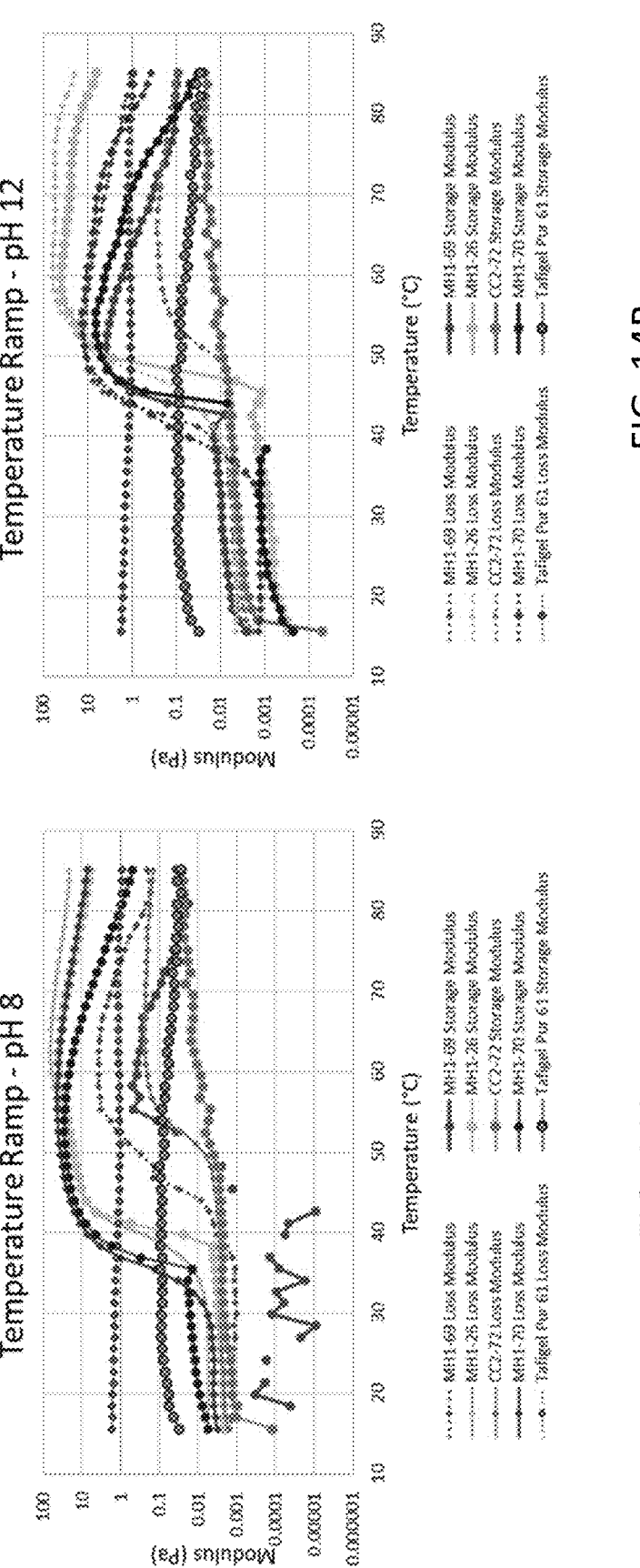
FIG. 14A shows a temperature ramp plot of other polymers at pH 8.
FIG. 14B shows a temperature ramp plot of other polymers at pH 12.
Figure 15:
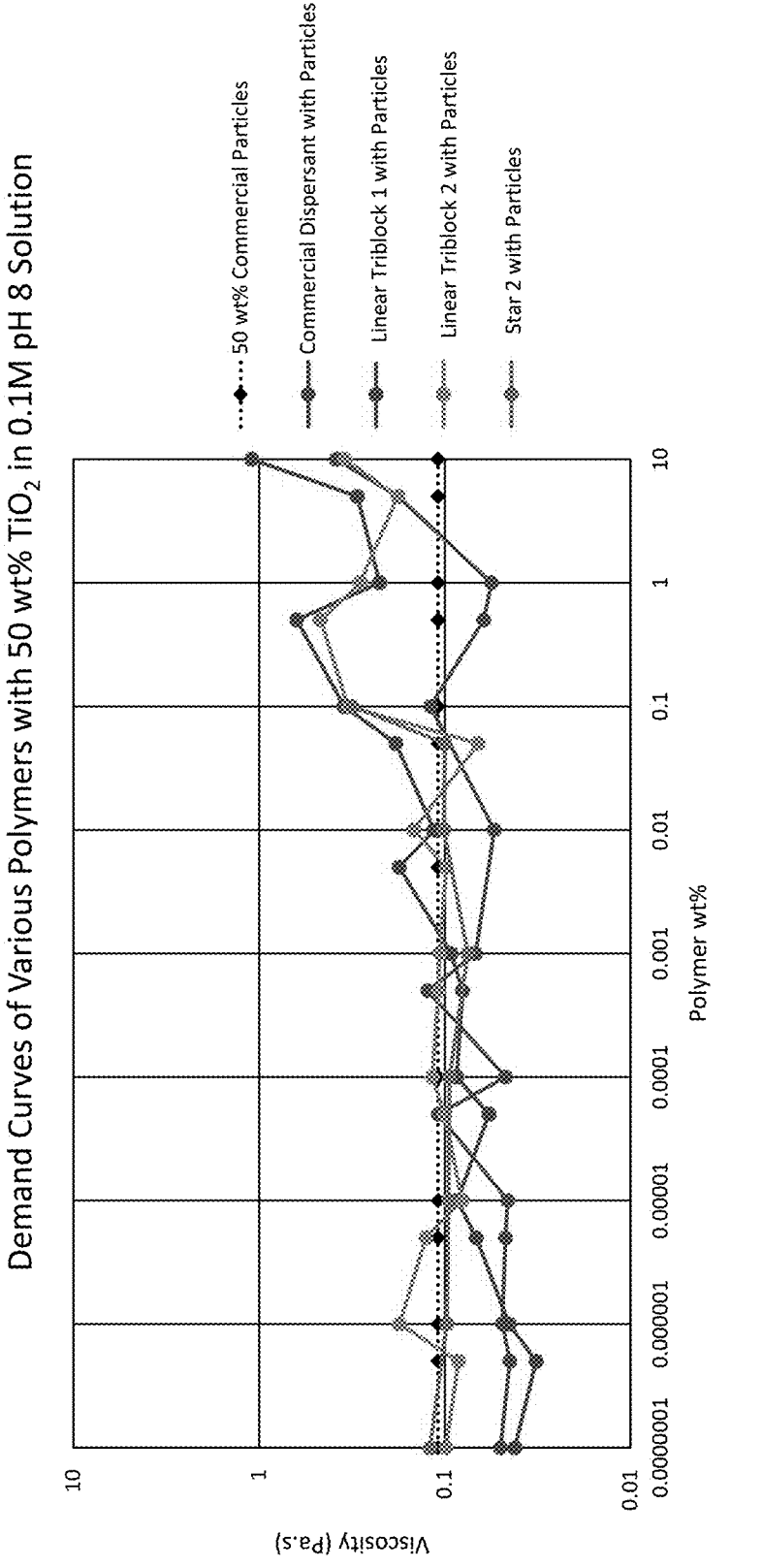
FIG. 15 plots demand curves of a composition containing an illustrative star stimuli-responsive block copolymer according to the present disclosure and 50 weight % $TiO_2$ (275 nm and having an aluminum oxide coating) as compared to compositions with other polymers.

The present non-linear stimuli-responsive block copolymers may be used in a variety of applications, including as additives in coating compositions such as paints, primers, and stains. The present disclosure encompasses coating compositions comprising any of the disclosed stimuli-responsive block copolymers in any desired amount (e.g., from 0.0001 mg/mL to 10 mg/mL, from 0.001 mg/mL to 10 mg/mL, from 0.01 mg/mL to 10 mg/mL, and from 0.1 mg/mL to 10 mg/mL) and pigment particles. Various pigment particles may be used, e.g., $TiO_2$ particles. The $TiO_2$ particles may be coated, e.g., with silica and/or zirconia. The coating compositions may include other components generally present in such compositions, e.g., fillers, solvents. The coating compositions may be water-based. The pH of the coating composition may be above 7, e.g., 8 to 12. FIG. 6 shows a schematic illustration of the incorporation of two stimuli-responsive block copolymers according to the present disclosure into a coating composition comprising coated $TiO_2$ particles. Due to their unique composition and morphology, the block copolymers beneficially improve the dispersion of the coated $TiO_2$ particles and the rheology of the coating composition.

EXAMPLES

Seven non-linear stimuli-responsive block copolymers were synthesized using ARGET ATRP. Three Tween 20-PDMAEMA star block copolymers were synthesized using the PEG precursor Tween 20 according to the synthetic scheme shown in FIG. 3 and described above. First, to synthesize the Tween 20-Br macroinitiator, 1 mol of Tween 20, 4 mol BiBB, and 4.8 mol TEA was used. The reaction was allowed to proceed on ice, under N2, for about 24 hours. The macroinitiator was recovered via precipitation, extraction, and drying. $^1$H NMR was used to confirm synthesis of the macroinitiator. Next, to synthesize the three Tween 20-PDMAEMA star block copolymers (each having a different Tween 20-Br:DMAEMA molar ratio), the following were used: 0.0016 g $CuCl_2$, 5 mL DMAEMA, 0.0172 g TPMA, 0.021 g ascorbic acid, 8-10 mL anisole, and either 1.6595 g Tween 20-Br (1:2 Tween 20-Br:DMAEMA), 3.319 g Tween 20-Br (1:1 Tween 20-Br:DMAEMA), or 6.638 g Tween 20-Br (2:1 Tween 20-Br:DMAEMA). The free-radical polymerization was allowed to proceed at 50° C., under N2, for about 24-48 hours. The three Tween 20-PDMAEMA star block copolymers were recovered via precipitation, filtering, and drying.

Three Tween 28-PDMAEMA star block copolymers were synthesized using the PEG precursor Tween 28 (see FIG. 4A) according to the synthetic scheme shown in FIG. 3 and described above. The synthesis of the Tween 28-Br macroinitiator was as described for Tween 20-Br, except that 1 mol Tween 28, 25 mol BiBB, and 30 mol TEA were used. The synthesis of the Tween 28-PDMAEMA star block copolymers were as described for Tween 20-PDMAEMA star block copolymers, except that 1.078 g Tween 28-Br (1:2 Tween 28-Br:DMAEMA), 2.157 g Tween 28-Br (1:1 Tween 28-Br: DMAEMA), or 4.314 g Tween 28-Br (2:1 Tween 28-Br: DMAEMA) was used.

A PDMAEMA-block-poly(PEGMEMA) comb block copolymer was synthesized according to the synthetic scheme shown in FIG. 5 and described above. The ARGET ATRP steps were as described for the star block copolymers above, except that for ARGET ATRP #1, 0.216 mL ethyl α-bromoisobutyrate, 5 mL DMAEAMA, 0.0337 g TPMA, 0.045 g ascorbic acid (AA), and 0.0066 g $CuBr_2$ was used. For ARGET ATRP #2, 2 g PDMAEMA-Br from step 1, 1 mL PEGMEMA, 8 mL methanol, 2 mL water, 0.0036 g 2,2'-bipyridyl, 0.0024 g ascorbic acid, and 0.0013 g $CuBr_2$ at 60° C. were used.

Properties such as cloud point, solubility, interfacial tension, and various rheological properties were measured for the non-linear stimuli responsive block copolymers and compared to other comparative polymers, including linear block copolymers. Properties were measured as described in U.S. Pat. Pub. No. 20220282095, which is hereby incorporated by reference in its entirety. The results are shown in FIGS. 7-15. These results include those demonstrating unique shear-thinning properties for the present non-linear stimuli responsive block copolymers. The table below summarizes data from the demand curves of FIG. 15. Regarding FIGS. 11A-11B and 12A-12B, additional data was collected for other comparative polymers including linear block copolymers.

TABLE 1

| | Demand Curve Data. | | | |
|---|---|---|---|---|
| Polymer | Ideal Concentration (weight %) | Viscosity (Pa · s) | Lowest Concentration with similar viscosity (weight %) | Viscosity (Pa · s) |
| Commercial Dispersant | 0.0000005 | 0.045 | 0.0000001 | 0.050 |
| Linear Block Copolymer 1 | 0.0000005 | 0.032 | 0.0000001 | 0.042 |
| Linear Block Copolymer 2 | 0.05 | 0.066 | 0.0000005 | 0.084 |
| Non-Linear Stimuli- Responsive Star Block Copolymer | 0.001 | 0.075 | 0.000001 | 0.098 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the invention to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

The term "consisting" may be used in place of any instance of the term "comprising" in the present disclosure.

The term "single" means only one, even if the term is used in the same sentence as "comprising."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

What is claimed is:

1. A composition comprising a non-linear stimuli-responsive block copolymer comprising a polyethylene glycol (PEG) block and a poly((2-dimethylamino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof, wherein the non-linear stimuli-responsive block copolymer has a star morphology wherein the core region comprises a central molecular moiety and the three or more branches extend radially away from the core region, and further wherein the central molecular moiety is a sorbitan moiety, a branched alkyl moiety, or a diamide moiety.

2. The composition of claim 1, wherein the non-linear stimuli-responsive block copolymer comprises multiple PEG blocks and the PDMAEMA block.

3. The composition of claim 1, wherein the three or more branches comprise at least one PEG-PDMAEMA branch.

4. The composition of claim 1, wherein the central molecular moiety is the sorbitan moiety.

5. The composition of claim 4, wherein the three or more branches comprise a PEG branch and multiple PEG-PDMAEMA branches.

6. A composition comprising a non-linear stimuli-responsive block copolymer comprising a polyethylene glycol (PEG) block and a poly((2-dimethylamino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof, wherein the non-linear stimuli-responsive block copolymer has a star morphology wherein the core region comprises a central molecular moiety and the three or more branches extend radially away from the core region, wherein the central molecular moiety is a sorbitan moiety, wherein the three or more branches comprise a PEG branch and multiple PEG-PDMAEMA branches, and wherein the PEG branch comprises a fatty acid moiety covalently bound to a PEG block of the PEG branch.

7. The composition of claim 5, wherein there are three PEG-PDMAEMA branches.

8. The composition of claim 5, wherein the PEG branch comprises a fatty acid moiety covalently bound to a PEG block of the PEG branch and there are three PEG-PDMAEMA branches.

9. The composition of claim 8, wherein a total number of repeating oxyethylene units in the non-linear stimuli-responsive block copolymer is in a range of from 20 to 80 and a molar ratio of oxyethylene units to (2-dimethylamino)ethyl methacrylate units is in a range of from 1:0.1 to 1:5.

10. The composition of claim 9, wherein the fatty acid moiety is selected from lauric acid, oleic acid, stearic acid, and palmitic acid.

11. The composition of claim 1, wherein the non-linear stimuli-responsive block copolymer consists of the core region, wherein the central molecular moiety is the sorbitan moiety; four branches consisting of a PEG branch having the PEG block, a first PEG-PDMAEMA branch having the PDMAEMA block, a second PEG-PDMAEMA branch, and a third PEG-PDMAEMA branch; and a fatty acid moiety covalently bound to the PEG block of the PEG branch.

12. A composition comprising a non-linear stimuli-responsive block copolymer comprising a polyethylene glycol (PEG) block and a poly((2-dimethylamino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof, wherein the non-linear stimuli-responsive block copolymer has a comb morphology wherein the core region comprises an extended, polymeric molecular chain and the three or more branches are distributed along the extended, polymeric molecular chain and extend away therefrom.

13. The composition of claim 12, wherein the core region is a polyether moiety and the three or more branches comprise a PEG branch and multiple PEG-PDMAEMA branches.

14. The composition of claim 12, wherein the core region is a polyalkyl moiety and the three or more branches comprise a PDMAEMA branch and multiple PEG branches.

15. The composition of claim 1, wherein the non-linear stimuli-responsive block copolymer is a polymerization product of reactants comprising a halide-functionalized PEG precursor and (2-dimethylamino)ethyl methacrylate (DMAEMA).

16. The composition of claim 15, wherein the halide-functionalized PEG precursor is selected from halide-functionalized poly(oxyethylene) n-sorbitan-monolaurate, wherein n=20; halide-functionalized poly(oxyethylene) n-sorbitan-monolaurate, wherein n=80; halide-functionalized polyoxyethylene sorbitan monooleate; halide-functionalized polyoxyethylene sorbitan monostearate; and halide-functionalized polyoxyethylene sorbitan monopalmitate.

17. The composition of claim 1, wherein the composition further comprises pigment particles and a solvent.

18. A composition comprising a non-linear stimuli-responsive block copolymer comprising a polyethylene glycol (PEG) block and a poly((2-dimethylamino)ethyl methacrylate) (PDMAEMA) block, wherein the non-linear stimuli-responsive block copolymer comprises a core region and three or more branches extending away from the core region, wherein the three or more branches comprise a branch comprising the PEG block, a branch comprising the PDMAEMA block, a branch comprising both the PEG block and the PDMAEMA block, or a combination thereof, wherein the composition further comprises pigment particles and a solvent, and further wherein the pigment particles comprise $TiO_2$ particles.

19. The composition of claim 1, wherein the branched alkyl moiety is unsubstituted.

20. The composition of claim 1, wherein the central molecular moiety is non-polymeric.

\* \* \* \* \*